(12) United States Patent
Sonat et al.

(10) Patent No.: US 11,885,195 B2
(45) Date of Patent: Jan. 30, 2024

(54) SWELLABLE METAL MATERIAL WITH SILICA

(71) Applicant: Halliburton Energy Services, Inc., Houston, TX (US)

(72) Inventors: Cem Sonat, Singapore (SG); Michael Linley Fripp, Singapore (SG); Shashwat Shukla, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 44 days.

(21) Appl. No.: 17/487,970

(22) Filed: Sep. 28, 2021

(65) Prior Publication Data
US 2023/0116957 A1    Apr. 20, 2023

(51) Int. Cl.
*E21B 33/12* (2006.01)
*C01B 33/12* (2006.01)
*F16J 15/08* (2006.01)

(52) U.S. Cl.
CPC .......... *E21B 33/1208* (2013.01); *C01B 33/12* (2013.01); *E21B 2200/01* (2020.05); *F16J 15/0806* (2013.01)

(58) Field of Classification Search
CPC .. E21B 33/1208; E21B 2200/01; C01B 33/12
See application file for complete search history.

(56) References Cited

U.S. PATENT DOCUMENTS

| | | | |
|---|---|---|---|
| 8,689,894 B2 | 4/2014 | Regnault De La Mothe et al. | |
| 9,416,615 B2 | 8/2016 | Regnault De La Mothe et al. | |
| 11,047,203 B2 | 6/2021 | Fripp et al. | |
| 2012/0175134 A1 | 7/2012 | Robisson et al. | |
| 2013/0056207 A1 | 3/2013 | Wood et al. | |
| 2016/0290090 A1* | 10/2016 | Murphree | E21B 33/129 |
| 2020/0325749 A1* | 10/2020 | Fripp | E21B 33/10 |
| 2021/0017441 A1 | 1/2021 | Fripp et al. | |

FOREIGN PATENT DOCUMENTS

| | | |
|---|---|---|
| EP | 0816301 A2 | 1/1998 |
| WO | 2017011655 A1 | 1/2017 |
| WO | 2019094044 | 5/2019 |
| WO | 2019147285 A1 | 8/2019 |
| WO | 2019164499 | 8/2019 |

OTHER PUBLICATIONS

International Application, International Search Report and Written Opinion, PCT/US2021/052631, dated Jun. 22, 2022, 10 pages.
Sonat, "Mechanic Performance and Development of MgO—SiO2—H2O Systems", Doctoral Thesis, Nanyang Technological University, Singapore, 2019, 206 pages.
Search Report, NL2032858, dated Feb. 22, 203, 10 pages.
Netherlands Patent Application No. 2034666, Partial Search Report dated Oct. 11, 2023, 16 pages (English machine translation provided).

* cited by examiner

*Primary Examiner* — Crystal J. Lee
(74) *Attorney, Agent, or Firm* — Kilpatrick Townsend & Stockton LLP (57) ABSTRACT

A tubing string may include a swellable metal material for providing a seal downhole. The swellable metal material may react with a silica material and a water-based fluid to cause the swellable metal material to swell and form a seal within a flow path defined in part by the tubing string.

16 Claims, 7 Drawing Sheets

SWELLABLE METAL MATERIAL WITH SILICA

TECHNICAL FIELD

The present disclosure relates generally to materials usable in a downhole environment for creating a seal. More specifically, but not by way of limitation, this disclosure relates to a swellable metal material reacting with a silicate and a water-based fluid for forming a metal hydrate for a seal and/or anchor downhole.

BACKGROUND

Various materials can be used to produce sealing elements in wellbore environments. The sealing elements may be used for example to form annular seals in a wellbore. The annular seals may isolate fluid or pressure within portions of a flow path of the wellbore from other portions of the flow path. Metal materials may be used to form seals, however, some metal materials may lack the integrity needed to provide an effective seal.

DETAILED DESCRIPTION

Certain aspects and features relate to an assembly positionable downhole in a wellbore including an oilfield tubular, for example a tubing string, a coiled tubing, or similar tubulars, having a swellable metal material positioned at least partially around the tubing string for forming a seal in a downhole environment. The swellable metal material can react with silica, for example but not limited to an amorphous silica, and a water-based fluid to cause the swellable metal material to swell or expand to form a fluid seal within a flow path within the wellbore, for example but not limited to within an annulus of the wellbore. The term silica as used herein refers to any molecule that is a combination of silicon and oxygen, though other molecules may also be included. The silica can facilitate the chemical reaction of the swellable metal material with the water-based fluid for forming a final product that is a "metal-silicate hydrate". The metal of the metal-silicate-hydrate can be for example magnesium, aluminum, zinc, silicon, calcium, iron, nickel, or a combination of metals. The silica may be included within the swellable metal material, near the swellable metal material, within the water-based fluid, or any suitable combination thereof. The water-based fluid contacting the swellable metal material and the silica can cause the swellable metal material to swell and form the fluid seal within a flow path, for example but not limited to an annulus of the wellbore. The fluid seal can prevent fluid flow between two separate portions of the flow path, for example but not limited to a flow path along an inner diameter of the tubular or a flow path along an outer diameter of the tubular. The swellable metal material can be positioned at various points along a tubing string for forming multiple seals at various locations about the tubing string when the swellable metal materials react with silica and the water-based fluid.

Seals and/or anchors formed according to aspects of the present disclosure can improve the seal strength, the anchor strength, and/or the setting behavior of the seal. Additionally, the final metal-silicate-hydrate product can enable significant mechanical performance in wellbore applications. For example, a magnesium-silicate-hydrate (M—S—H) made from magnesium may be able to provide compressive strength that is four to five times higher than that of magnesium hydroxide. Silica can block the pores in cement within a wellbore, and thus, the permeability of the final product can be reduced. Additionally, silica can increase the thixotropic behavior of a partially formed swellable metal material which may reduce the slumping behavior of the metal material and increase the resistance of the metal material to crossflow within the wellbore. The final product may also provide higher differential pressure capacity and higher anchorage force. Further, the final metal-silicate-hydrate product may be more stable in a wellbore operation when exposed to other downhole chemicals. The improved properties provided by the final metal-silicate-hydrate product can allow for improved applications of expanding metal technology and can also broaden the reach of expanding metal technology.

The system having the swellable metal material and the water-based fluid for inducing a chemical reaction can include silica according to several different embodiments. In some embodiments, the silica may be introduced to the system at the surface through the water-based fluid. In some embodiments, the silica may be introduced directly into the swellable metal material. In some embodiments, the silica can be introduced to the system by being positioned proximate to the swellable metal material. In any example, the silica may be positionable in a way to contact the swellable metal material and the water-based fluid for causing the chemical reaction to occur.

These illustrative examples are given to introduce the reader to the general subject matter discussed here and are not intended to limit the scope of the disclosed concepts. The following sections describe various additional features and examples with reference to the drawings but, like the illustrative aspects, should not be used to limit the present disclosure.

Figure 1:
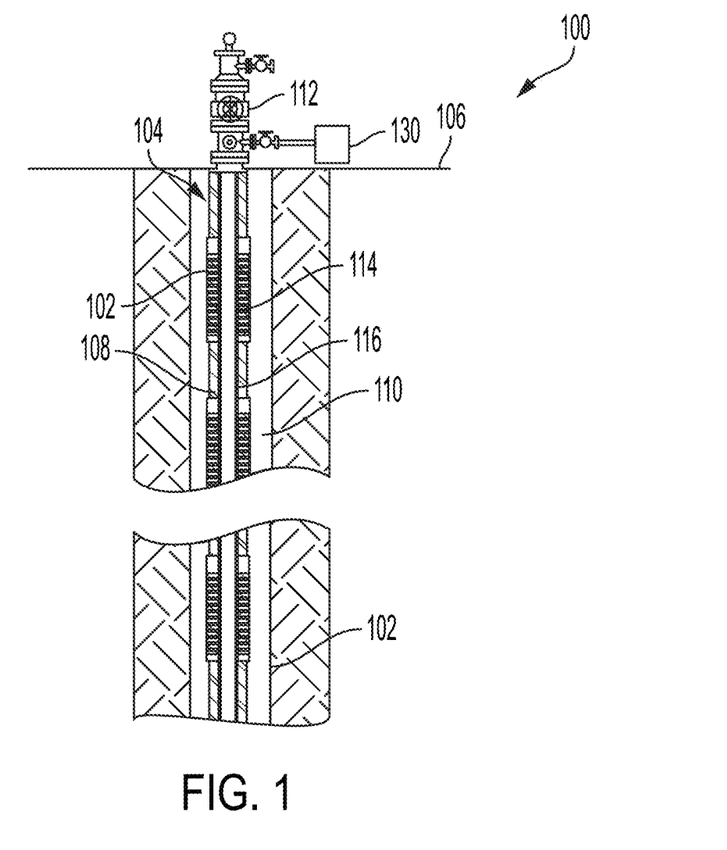
FIG. 1 is a schematic of a well system that includes a tubing string having a swellable metal material positioned about the tubing string for forming a seal, according to an aspect of the present disclosure.

FIG. 1 is a schematic of a well system 100 that includes an oil field tubular, for example but not limited to a tubing string 116 having a swellable metal material 114 positioned about the tubing string 116 for forming a seal, according to one example of the present disclosure. The well system 100 can include a casing string 102 positioned in a wellbore 104 that has been formed in a surface 106 of the earth and through the subterranean formation 118. The well system 100 may have been constructed and completed in any suitable manner, such as by use of a drilling assembly having a drill bit for creating the wellbore 104. The casing string 102 may include tubular casing sections connected by end-to-end couplings. In some aspects, the casing string 102 may be made of a suitable material such as steel. Within the wellbore 104, cement 110 may be injected and allowed to set between an outer surface of the casing string 102 and an inner surface of the wellbore 104. Within an inner surface of the casing string 102, there may be a tubing string (or work string) 116. The tubing string 116 can extend from the surface 106 within the wellbore 104. In some aspects, the tubing string 116 may include a series of jointed pipes, in some aspects the tubing string 116 may be a coiled tubing. An annulus 108 defining a flow path may be formed between an inner surface of the casing string 102 and an outer surface of the tubing string 116. In some aspects, the well system 100 may not include the casing string 102, instead the tubing string 116 may extend within the wellbore 104 defining a flow path within an annulus between the outer surface of the tubing string 116 and the wellbore 104. At the surface 106 of the wellbore 104, a tree assembly 112 may be joined to the casing string 102. The tree assembly 112 may include an assembly of valves, spools, fittings, etc. to direct and control the flow of fluid (e.g., oil, gas, water, etc.) into or out of the wellbore 104 within the casing string 102. For example, a pump 130 (e.g., well stimulation pumping equipment) can be coupled to the tree assembly 112 for injecting a wellbore fluid into the wellbore 104. In some aspects, the wellbore fluid (not shown in FIG. 1) may be a water-based fluid (e.g., brine, wellbore cleanup fluid) injected downhole for reacting with the swellable metal material 114 for forming a seal.

In some embodiments, the swellable metal material 114 may be wrapped at least partially around an outer surface of the tubing string 116 before the tubing string 116 is positioned downhole. In some aspects, the swellable metal material 114 can be positioned at several intervals along the tubing string 116 such that the swellable metal material 114 isolates sections of the tubing string 116. The swellable metal material 114 may also be in a suitable position to be contacted by the wellbore fluid. Silica, including but not limited to SiO2, may be included with the swellable metal material 114, near the swellable metal material 114, or with the water-based fluid according to different embodiments described with respect to FIGS. 2A-4B. In some aspects, the pump 130 at the well system 100 can be used to inject the water-based fluid into the annulus 108 for putting the water-based fluid in contact with the swellable metal material 114 and silica.

In some aspects, the silica may be an amorphous silica. The silica can be, for example but not limited to, a microsilica or a silica fume powder. Additionally or alternatively, the silica can come from industrial waste materials such as rice husk ash, fly ash, or ground granulated blast-furnace slag (GGBS). Further, the silica can come from metakaolin, silicon dioxide, silica gel, colloidal silica, fumed silica, fused silica, a silicate (e.g., magnesium silicate, potassium silicate, sodium silicate, calcium silicate, ethyl silicate, zirconium silicate, asbestos, or talc), silicic acid solution, or pozzolans (e.g., diatomaceous earth). In some aspects, the silica can be supplied as a solid or as a liquid. In some aspects, the silica can be a spheroid with an approximate diameter of between about 1 nm to about 1 mm or any suitable diameter within that range, for example between about 1 nm and 800 nm, between about 100 nm and about 600 nm, between about 200 nm and about 500 nm, or any other suitable range of diameters. In some aspects, the amorphous silica can be cylindrical, flaked, or any other shape.

Figure 2A:
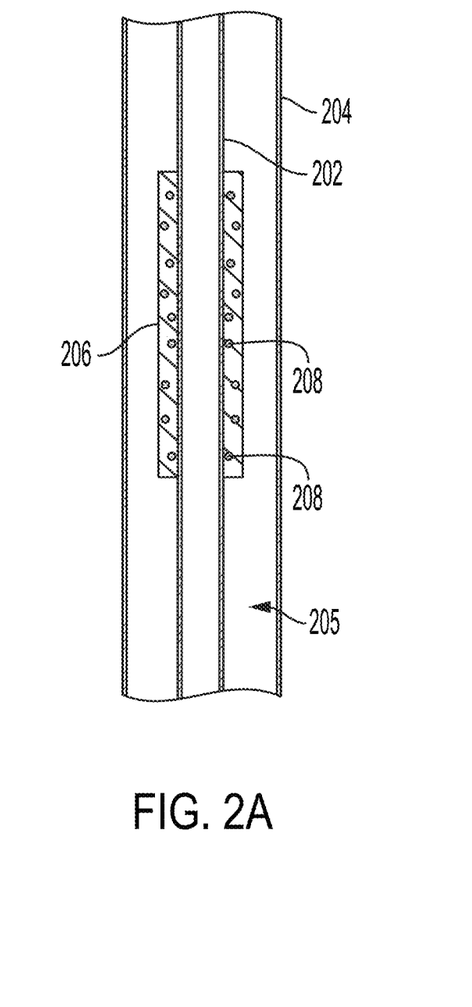
FIG. 2A is a cross-sectional view of a tubing string including a swellable metal material for forming a seal in an initial unexpanded state, according to an aspect of the present disclosure.

FIG. 2A is a cross-sectional view of an oil field tubular, for example but not limited to a tubing string 202 positioned within a casing string 204. In some aspects, the tubing string 202 may be a coiled tubing. The tubing string 202 can include a swellable metal material 206 positioned about the tubing string 202. The swellable metal material 206 can include silica 208 distributed within the swellable metal material 206. In some aspects of the present disclosure, silica fume powder can be pressed into pellets, which may then be incorporated into the swellable metal material 206. Examples of processes for incorporating the silica 208 into the swellable metal material 206 include a forging process or a powder metallurgy process, though any suitable processes may be used. In some aspects of the present disclosure, silica 208 can be incorporated into the swellable metal material 206 as a compression step after the swellable metal material 206 has been formed.

The swellable metal material 206 may be a solid metal alloy. In some aspects, the swellable metal material 206 can be made from a reactive metal such as magnesium, aluminum, zinc, iron, silicon, calcium, strontium, or other suitable metal, or any suitable combination thereof. In some aspects, a metal alloy can be used for changing a strength of the swellable metal material 206, changing a reaction speed of the swellable metal material, or any suitable combination thereof. In some aspects, copper, iron, or nickel can be added to the reactive metal for accelerating the reaction speed. The metal alloy can result in at least a portion of the swellable metal material 206 being a reactive metal. In some aspects, the swellable metal material 206 can be made by extrusion, forging, or casing. In some aspects, the reactive metal can be mixed into a polymer for creating the swellable metal material 206.

Figure 2B:
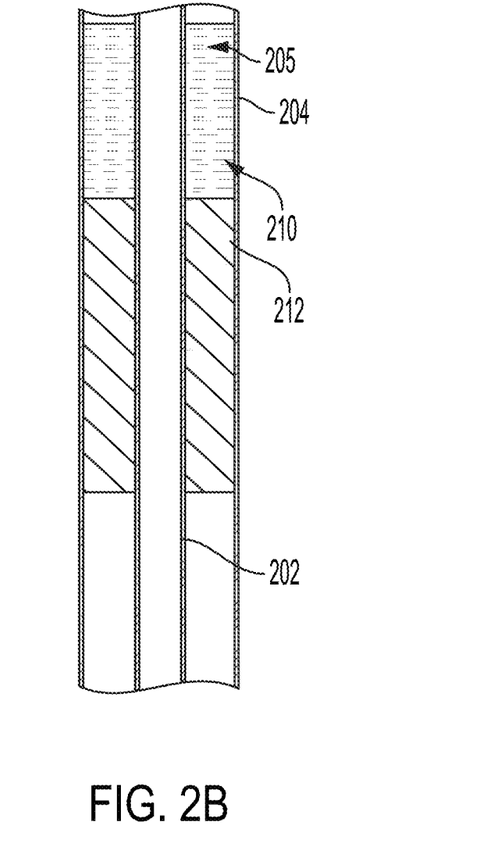
FIG. 2B is a cross-sectional view of the tubing string including the swellable metal material of FIG. 2A, in an expanded state forming a seal, according to an aspect of the present disclosure.

Prior to a water-based fluid 210 being pumped into an annulus 205 between the tubing string 202 and the casing string 204, the swellable metal material 206 may be in an initial unexpanded state. In its initial position prior to expansion, the swellable metal material 206 may not contact an inner surface of the casing string 204. As shown in FIG. 2B, the water-based fluid 210 may be injected into the annulus 205 of the wellbore to contact the swellable metal material 206. The water-based fluid 210 may contact the swellable metal material 206 and initiate a chemical reaction between the swellable metal material 206, including the silica 208. In some embodiments, the water-based fluid 210 can include additional silica for contributing to the chemical reaction. The swellable metal material 206 may be electrically conductive and/or thermally conductive. In some aspects, the swellable metal material 206 may have a thickness of about 1/10 inch or greater.

In response to the chemical reaction, the swellable metal material 206 may expand to form a reactant portion 212. During the chemical reaction, metal ions are formed and the dissolution of silica 208 may form silicate ions nearly simultaneously. In some aspects, the swellable metal material 206 may be converted into metal oxide (e.g., MgO), metal hydroxide (e.g., Mg(OH)2), and metal-silicate-hydrate (e.g., M—S—H, or $(MgO)3(SiO_2)2(H2O)2+H2O$) during different stages of the reaction. In some aspects, the swellable metal material 206 can initially react with the water-based fluid 210 to form an intermediate-stage product that is a metal oxide. In some aspects, the metal oxide can subsequently react with water to form a final-stage product that is a metal hydroxide. Where the swellable metal material 206 is, magnesium (Mg) can become magnesium oxide (MgO), and subsequently magnesium oxide can become magnesium hydroxide (Mg(OH)2), such as demonstrated in Equations 1 and 2.

$$Mg + H_2O \rightarrow MgO + H_2 \quad (1)$$

$$MgO + H_2O \rightarrow Mg(OH)_2 \quad (2)$$

The reaction of the swellable metal material 206 can occur in a dissolution stage and a precipitation stage. In the case of Mg turning into $Mg(OH)_2$, the reaction can be represented by the dissolution of MgO in Equation 3 and the precipitation of $Mg(OH)_2$ in Equation 4.

$$MgO(s) + H_2O \rightarrow Mg^{2+}(aq) + 2OH^-(aq) \quad (3)$$

$$Mg^{2+}(aq) + 2OH^-(aq) \rightarrow Mg(OH)_{2(s)} \quad (4)$$

The dissolution of MgO (Equation 3) can result in the formation of free $Mg^{+2}$ ions. Subsequently, the silica 208, shown in this non-limiting example as ($SiO_2$,) present in the system including the swellable metal material 206 can undergo a silica dissociation reaction, such as in Equations 5 and 6, and produce additional free ions with which the free $Mg^{+2}$ ions can chemically combine.

$$SiO_2 + 2OH^- \rightarrow H_2SiO_4^{2-} \quad (5)$$

$$SiO_2 + OH^- + H_2O \rightarrow H_3SiO_4 \quad (6)$$

In some aspects, the dissociation of silica 208 can occur at elevated pH conditions. The silica ($SiO_2$) can disassociate into its silicate ions, and the Mg+2 ions may react with the additional free silicate ions to form a new product that is a metal-silicate-hydrate, specifically M—S—H, such as in Equation 7.

$$3Mg^{+2} + 6OH^- + 2SiO_2(MgO)_3(SiO_2)_2(H_2O)_2 + H_2O \quad (7)$$

The reactant portion 212 corresponding to the swellable metal material 206 in its expanded form, defining the seal, comprises the final product of the chemical reaction, a "metal-silicate-hydrate." While the reactant portion 212 depicts the entirety of the swellable metal material 206 reacting with the silica 208 and water-based fluid 210 to form a metal-silicate-hydrate, some portion of the swellable metal material 206 may not undergo the chemical reaction and may remain in its original metal form. Where the swellable metal material 206 is magnesium, the final product forming the reactant portion 212 is magnesium-silicate-hydrate (M—S—H). Examples of potential forms of the M—S—H reaction product can include $Mg_3(Si_2O_5)(OH)_4$, $Mg_3(Si_2O_5)(OH)_4$, $Mg_3(Si_2O_5)(OH)_4$, $Mg_4(Si_6O_{15})(OH)_2 \cdot 6H_2O$, $Ca_{0.25}(Mg,Fe)_3((Si,Al)_4O_{10})(OH)_2 \cdot nH_2O$, and $Mg_3(Si_4O_{10})(OH)_2$. The M—S—H can be a derivative of magnesium hydroxide and result in a final product that is slightly different from magnesium hydroxide such that the M—S—H has different properties than magnesium hydroxide. In some aspects, the swellable metal material 206 may be formed of an alternative metal material as described further below resulting in the final product forming the reactant portion 212 comprising a "metal-silicate-hydrate" of the alternative metal material. For example, the resulting final product may be C-S-H or C-A-S-H, in addition to other potential final products of "metal-silicate-hydrate."

Though the above reaction is described with respect to swellable metal material 206 that undergoes the chemical reaction being magnesium, it is to be understood that the reaction can occur in a similar manner for any appropriate alternative metal materials that may be used to produce the swellable metal material 206. For example, any of magnesium, aluminum, zinc, iron, silicon, calcium, strontium, or any suitable combination thereof.

The reactant portion 212 corresponding to the swellable metal material 206 in its expanded form extends between the outer surface of the tubing string 202 and the inner surface of the casing string 204 to form a fluid seal within a flow path, as shown in FIG. 2A-2B as the annulus 205 and may block the fluid flow through the annulus 205. Though only a single portion of swellable metal material 206 is depicted in FIGS. 2A-4B, additional portions of swellable metal material 206 may be positioned about the tubing string 202.

The swellable metal material 206 may be dissolvable as a result of reacting with silica 208 and water-based fluid 210 to form the reactant portion 212. For example, as the silica 208 reacts with the swellable metal material 206, there can be a corresponding expansion of the solid phase of the swellable metal material 206, which causes the swellable metal material 206 to swell. In some embodiments, where the swellable metal material 206 is magnesium, there can be a mixture of enough silica 208 to have a complete reaction that renders the M—S—H formation. In addition to M—S—H, formation of Mg(OH)2 can still be observed as a portion of the final product, depending on the weight ratio of the initial Mg and SiO2 materials. In some embodiments, the ratio of Mg:SiO2 materials can be 1:20, 1:3, 1:1, 10:1, or 100:1, or any other suitable ratio that may form some amount of metal hydroxide.

In some aspects, the dissolution of silica 208 or the amount of silica 208 can be enhanced by including silica-enhancing chemicals in the fluid (e.g., brine) that facilitates the chemical reaction. Silica-enhancing chemicals can be used in the fluid to regulate the pH of the fluid and thus enhance the dissolution or amount of silica 208. In a preferred embodiment, sodium hexametaphosphate can be used. In different embodiments, other chemicals can be used for regulating the pH of the fluid. Examples of silica-enhancing chemicals can include sodium metasilicate, sodium hydroxide, and sodium orthophosphate. The silica-enhancing chemicals can be dissolved in the water-based fluid 210 prior to injection of the water-based fluid 210 to contact the swellable metal material 206.

Figure 3A:
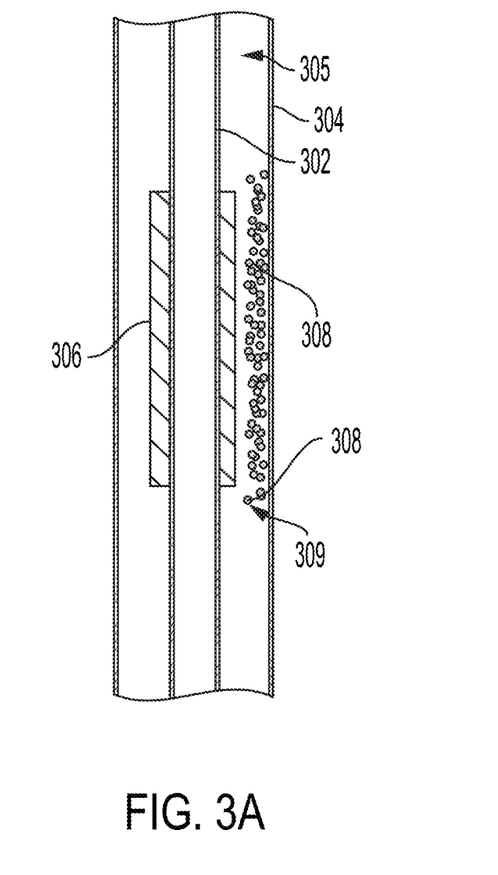
FIG. 3A is a cross-sectional view of a tubing string including a swellable metal material for forming a seal in an initial unexpanded state, according to another aspect of the present disclosure.

FIG. 3A is a cross-sectional view of an oilfield tubular, for example but not limited to a tubing string 302 positioned within a casing string 304. In some aspects, a the tubing string 302 may be a coiled tubing. The tubing string 302 can include a swellable metal material 306 positioned about the tubing string 302. The swellable metal material 306 can include silica 308 located separately from the swellable metal material 306. In some aspects, for example as shown in FIG. 3A, granules of silica 308 can be incorporated within an encapsulation (or coating) 309. The encapsulation 309 can be a material that is degradable in response to contact with water or in response to an application of a predetermined temperature. The encapsulation 309 can be, for example but not limited to, an aliphatic polyester, a dissolvable metal alloy, or a water dissolvable urethane. Other examples of the material of the encapsulation 309 can include a wax, polymer, or fusible alloy that melts at a predetermined temperature. The encapsulation 309 can encompass a single particle of silica or it may encompass many particles. The silica 308 can be positioned adjacent to the swellable metal material 306 but may not be incorporated directly into the swellable metal material 306. A plurality of silica 308 in encapsulation 309 may be used, depending on a chosen weight ratio of the swellable metal material 306 to the silica 308. In some aspects, the silica 308 can be positioned adjacent to the swellable metal material 306 in a loose form. In one embodiment, the silica 308 is affixed to the a part of the tubing string with a material that is degradable in response in response to contact with water or in response to an application of a predetermined temperature. Degradation of the bond results in the silica 308 be a position proximate the swellable metal material 306. In some embodiments, the silica 308 can be placed radially next to the swellable metal material 306, axially next to the swellable metal material 306, or interspaced with the swellable metal material 306. In some aspects, where the amorphous silica 308 is interspaced with the swellable metal material 306, the silica 308 can be placed along the tubing string 302 in between the multiple portions of the swellable metal material 306 positioned along the tubing string 302. The encapsulation 309 can be pumped down from the surface 106 of the wellbore 104 to be positioned next to the swellable metal material 306.

In some aspects, the silica 308 may be an amorphous silica. The silica can be, for example but not limited to, a microsilica or a silica fume powder. Additionally or alternatively, the silica can come from industrial waste materials such as rice husk ash, fly ash, or ground granulated blast-furnace slag (GGBS). Further, the silica 308 can come from metakaolin, silicon dioxide, silica gel, colloidal silica, fumed silica, fused silica, a silicate (e.g., magnesium silicate, potassium silicate, sodium silicate, calcium silicate, ethyl silicate, zirconium silicate, asbestos, or talc), silicic acid solution, or pozzolans (e.g., diatomaceous earth). In some aspects, the silica can be supplied as a solid or as a liquid. In some aspects, the silica can be a spheroid with an approximate diameter of between about 1 nm to about 1 mm or any suitable diameter within that range, for example between about 1 nm and 800 nm, between about 100 nm and about 600 nm, between about 200 nm and about 500 nm, or any other suitable range of diameters. In some aspects, the silica 308 can be cylindrical, flaked, or any other shape.

Figure 3B:
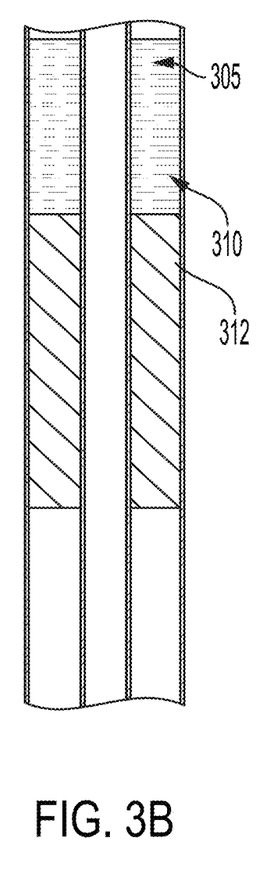
FIG. 3B is a cross-sectional view of the tubing string including the swellable metal material of FIG. 3A, in an expanded state forming a seal, according to another aspect of the present disclosure.

In some aspects, prior to a water-based fluid 310 being pumped into the annulus 305, the swellable metal material 306 may not be in contact with the casing string 304. FIG. 3B depicts a cross-sectional view of the tubing string of FIG. 3A including the swellable metal material 306 in an expanded state forming a seal extending between the tubing string 302 and the casing string 304 following a chemical reaction between the swellable metal material 306, the silica 308, and a water-based fluid 310. As shown in FIG. 3B, the water-based fluid 210 may be injected into the annulus 305 of the wellbore to contact the swellable metal material 306 and the silica 308. The water-based fluid 310 upon contacting the swellable metal material 306 and the silica 308 may initiate a chemical reaction between the swellable metal material 306, silica 308, and water-based fluid 310. The chemical reaction between the swellable metal material 306, the silica 308, and the water-based fluid 310 may result in the formation of a "metal-silicate-hydrate" as described above. For example, where the swellable metal material 306 comprises magnesium, the final product of the chemical reaction can be a "magnesium-silicate-hydrate." In some embodiments, the water-based fluid 310 can include additional silica 308 for contributing to the chemical reaction. In some aspects, the encapsulation 309 of the silica 308 may dissolve in response to contacting the water-based fluid 310. In response to the chemical reaction, the swellable metal material 306 may form a reactant portion 312. The same chemical reaction described with respect to FIGS. 2A-2B may occur. The swellable metal material 306 may thereby undergo the chemical reaction to form a "metal-silicate-hydrate" and in doing so may extend or swell to form a seal between the tubing string 302 and the casing string 304. In some aspects, the well system may not include the casing string 304 and the reactant portion 312 corresponding to the swellable metal material 306 in its expanded form may extend between the tubing string 302 and the wellbore 104. The swellable metal material 306 in its expanded form corresponding to the reactant portion 312 can form a seal within the annulus 305 of the wellbore 104 and may block the fluid flow from the surface 106 of the wellbore 104. In some aspects, the swellable metal material 306 can be positioned at various points along the tubing string 302 for forming multiple seals at various locations about the tubing string 302 when the swellable metal materials 306 react with silica 308 and the water-based fluid 310.

Figure 4A:
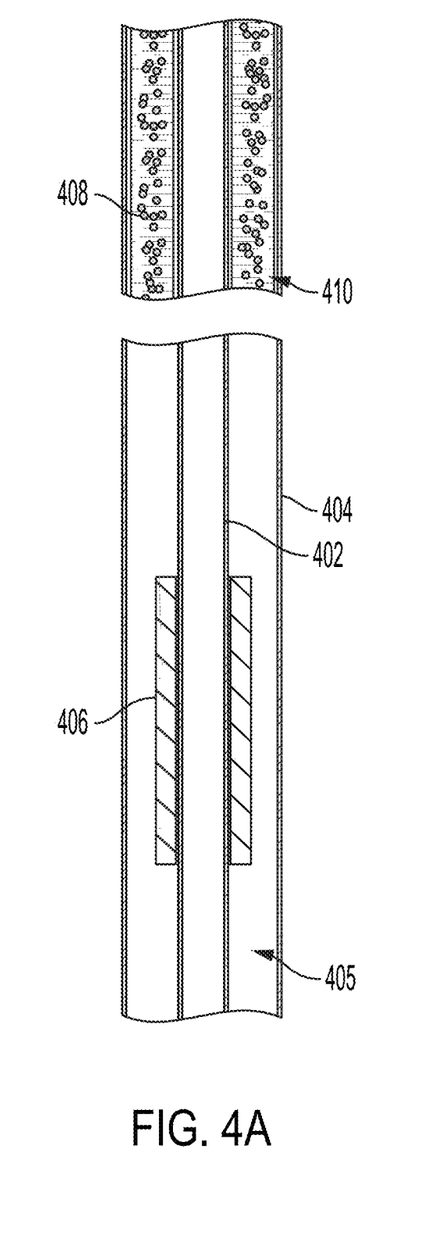
FIG. 4A is a cross-sectional view of a tubing string including a swellable metal material for forming a seal in an initial unexpanded state, according to another aspect of the present disclosure.
Figure 4B:
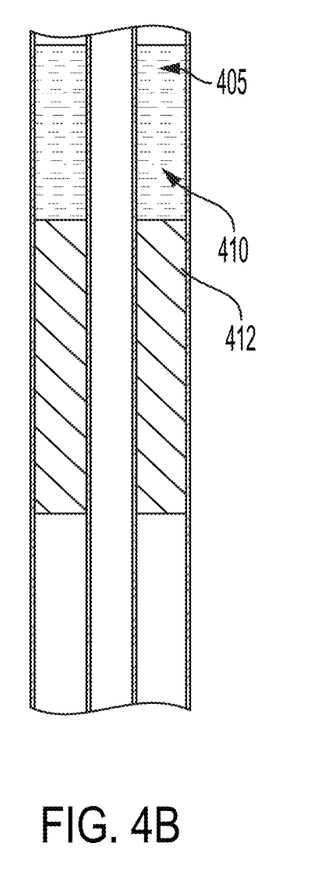
FIG. 4B is a cross-sectional view of the tubing string including the swellable metal material of FIG. 4A, in an expanded state forming a seal, according to another aspect of the present disclosure.

FIG. 4A is a cross-sectional view of an oilfield tubular, for example but not limited to a tubing string 402 positioned within a casing string 404. In some aspects, the tubing string 402 may be a coiled tubing. The tubing string 402 can include a swellable metal material 406 positioned about the tubing string 402. The swellable metal material 406 can include silica 408 dissolved within a water-based fluid 410. FIG. 4B depicts a cross-sectional view of the tubing string of FIG. 4A including the swellable metal material 406 in an expanded state forming a seal extending between the tubing string 402 and the casing string 404 following a chemical reaction between the swellable metal material 406, the silica 408, and a water-based fluid 410. In some aspects, the water-based fluid 410 can be wellbore cleanup fluid, brine, or any other suitable water-based fluid 410 usable for a wellbore operation. In some aspects, the silica 408 can be introduced as granules or flakes of powder that are mixed into the water-based fluid 410. In some aspects, the silica 408 can be introduced into the water-based fluid 410 as part of a filter cake that has been previously applied to the wellbore 104. In some aspects, the silica 408 can be dissolved within the water-based fluid 410 prior to the water-based fluid 410 being circulated downhole.

In some aspects, the silica 408 may be an amorphous silica. The silica can be, for example but not limited to, a microsilica or a silica fume powder. Additionally or alternatively, the silica 408 can come from industrial waste materials such as rice husk ash, fly ash, or ground granulated blast-furnace slag (GGBS). Further, the silica can come from metakaolin, silicon dioxide, silica gel, colloidal silica, fumed silica, fused silica, a silicate (e.g., magnesium silicate, potassium silicate, sodium silicate, calcium silicate, ethyl silicate, zirconium silicate, asbestos, or talc), silicic acid solution, or pozzolans (e.g., diatomaceous earth). In some aspects, the silica 408 can be supplied as a solid or as a liquid. In some aspects, the silica 408 can be a spheroid with an approximate diameter of between about 1 nm to about 1 mm or any suitable diameter within that range, for example between about 1 nm and 800 nm, between about 100 nm and about 600 nm, between about 200 nm and about 500 nm, or any other suitable range of diameters. In some aspects, the silica 408 can be cylindrical, flaked, or any other shape.

As shown in FIG. 4B, the water-based wellbore fluid 410 may be injected into a flow path, for example an annulus 405, of the wellbore 104 containing the swellable metal material 406. As described with respect to FIGS. 2A-3B above, a chemical reaction may occur between the swellable metal material 406, silica 408, and water-based fluid 410 to form a "metal-silicate-hydrate." The chemical reaction between the swellable metal material 406, the silica 408, and the water-based fluid 410 may result in the formation of a "metal-silicate-hydrate" as described above. For example, where the swellable metal material 406 comprises magnesium, the final product of the chemical reaction can be a "magnesium-silicate-hydrate." In response to the chemical reaction, the swellable metal material 406 may form a reactant portion 412. The same steps in the chemical reaction described with respect to FIGS. 2A-2B may occur. The swellable metal material 406 in forming the "metal-silicate-hydrate" may swell or expand to form a seal between the outer surface of the tubing string 402 and the inner surface of the casing string 404. In some aspects, the well system may not include the casing string 404 and the reactant portion 412 corresponding to the swellable metal material 406 in its expanded form may extend between the tubing string 402 and the wellbore 104. The reactant portion 412 corresponding to the swellable metal material 406 in its expanded position can thereby cause a fluid seal within the annulus 405 and may block any fluid flow. The swellable metal material 406 can be positioned at various points along the tubing string 402 for forming multiple seals at various locations about the tubing string 402 when the swellable metal materials 406 react with silica 408 and the water-based fluid 410.

In some aspects, a tubing string, including a coiled tubing string, may include a swellable metal material that may react with silica and a water-based fluid for forming a "metal-silicate-hydrate" that in so reacting causes the swellable metal material to swell or expand and form a seal within a wellbore is provided according to one or more of the following examples:

Example 1 is an apparatus may comprise an oilfield tubular positionable downhole. The apparatus may include a swellable metal material positioned proximate a surface of the oilfield tubular for swelling and causing a fluid seal within a flow path defined in part by the oilfield tubular in response to the swellable metal material being in contact with a water-based fluid. The swellable metal material may include silica.

Example 2 is the apparatus of example 1, the apparatus may further include the silica being an amorphous silica.

Example 3 is the apparatus of any of examples 1-2, the apparatus may have the water-based fluid including a silica-enhancing chemical used for enhancing a dissolution of the silica within the swellable metal material.

Example 4 is the apparatus of any of examples 1-3, the water-based fluid may further comprise additional silica.

Example 5 is the apparatus of any of examples 1-4, the swellable metal material may be configurable to react with the silica and the water-based fluid to result in a final product that is a metal-silicate-hydrate.

Example 6 is the apparatus of any of examples 1-5, the silica may be a microsilica or a silica fume powder.

Example 7 is the apparatus of any of examples 1-6, the swellable metal material may comprise at least one of magnesium, aluminum, zinc, iron, calcium, or strontium.

Example 8 is an apparatus that may comprise an oilfield tubular positionable downhole with a swellable metal material may at least partially surrounding a surface of the tubular, and a silica material positioned proximate to the swellable metal material for reacting with the swellable metal material and the water-based fluid to result in a final product that is a metal-silicate-hydrate.

Example 9 is the apparatus of example 8, further the silica material may be at least partially encapsulated within a degradable coating.

Example 10 is the apparatus of examples 9, further the degradable coating of the silica material may be dissolvable in response to contacting the water-based fluid.

Example 11 is the apparatus of any of examples 9-10, further the degradable coating of the silica material may be dissolvable in response to exposure to a predetermined temperature.

Example 12 is the apparatus of examples 9-11, further the degradable coating of the silica material may be an aliphatic polyester or a water dissolvable urethane.

Example 13 is the apparatus of examples 8-12, further the silica material may be an amorphous silica.

Example 14 is the apparatus of examples 8-13, further the swellable metal material may include at least one of magnesium, aluminum, zinc, iron, calcium, or strontium.

Example 15 is a method for forming a seal in a wellbore that may include the steps of providing a swellable sealing element that is at least partially comprised from a swellable metal material, providing a silica material, and exposing the swellable sealing element to a water-based fluid, wherein the swellable metal material swells in response to undergoing a chemical reaction with the water-based fluid and the silica material to form a metal-silicate hydrate.

Example 16 is the method of example 15, further the silica may be an amorphous silica.

Example 17 is the method of examples 15-16, further the silica material may be provided in the water-based fluid.

Example 18 is the method of examples 15-17, further the silica may be included within the swellable metal material.

Example 19 is the method of example 15-18, further the silica may be a microsilica or a silica fume.

Example 20 is the method of examples 15-19, further the swellable metal material may include at least one of magnesium, aluminum, zinc, iron, calcium, or strontium.

What is claimed is:

1. An apparatus comprising:
an oilfield tubular positionable downhole; and
a swellable metal material positioned proximate a surface of the oilfield tubular for swelling and causing a fluid seal within a flow path defined in part by the oilfield tubular in response to the swellable metal material being in contact with a water-based fluid,
wherein the swellable metal material includes an amorphous silica,
and wherein the swellable metal material is configurable to react with the amorphous silica and the water-based fluid to result in a final product that is a metal-silicate-hydrate.

2. The apparatus of claim 1, wherein the water-based fluid includes a silica-enhancing chemical used for enhancing a dissolution of the amorphous silica within the swellable metal material.

3. The apparatus of claim 1, wherein the water-based fluid further comprises additional silica.

4. The apparatus of claim 1, wherein the amorphous silica is a microsilica or a silica fume powder.

5. The apparatus of claim 1, wherein the swellable metal material comprises at least one of magnesium, aluminum, zinc, iron, calcium, or strontium.

6. An apparatus comprising:
an oilfield tubular positionable downhole;
a swellable metal material at least partially surrounding a surface of the oilfield tubular;
a silica material positioned proximate to the swellable metal material for reacting with the swellable metal material and a water-based fluid to result in a final product that is a metal-silicate-hydrate, wherein the silica material is at least partially encapsulated within a degradable coating.

7. The apparatus of claim 6, wherein the degradable coating of the silica material is dissolvable in response to contacting the water-based fluid.

8. The apparatus of claim 6, wherein the degradable coating of the silica material is dissolvable in response to exposure to a predetermined temperature.

9. The apparatus of claim 6, wherein the degradable coating of the silica material is an aliphatic polyester or a water dissolvable urethane.

10. The apparatus of claim 6, wherein the silica material is an amorphous silica.

11. The apparatus of claim 6, wherein the swellable metal material includes at least one of magnesium, aluminum, zinc, iron, calcium, or strontium.

12. A method for forming a seal in a wellbore comprising:
providing a swellable sealing element that is at least partially comprised from a swellable metal material;
providing a silica material, wherein the silica material is an amorphous silica;
exposing the swellable sealing element to a water-based fluid, wherein the swellable metal material swells in response to undergoing a chemical reaction with the water-based fluid and the silica material to form a metal-silicate-hydrate.

13. The method of claim 12, wherein the silica material is provided in the water-based fluid.

14. The method of claim 12, wherein the silica material is included within the swellable metal material.

15. The method of claim 12, wherein the silica material is a microsilica or a silica fume.

16. The method of claim 12, wherein the swellable metal material comprises at least one of magnesium, aluminum, zinc, iron, calcium, or strontium.

* * * * *